United States Patent
Schulze

(10) Patent No.: US 11,779,027 B2
(45) Date of Patent: Oct. 10, 2023

(54) APPARATUS AND METHOD FOR AUTOMATICALLY PROCESSING GUTTED POULTRY CARCASSES OR PARTS THEREOF

(71) Applicant: NORDISCHER MASCHINENBAU RUD. BAADER GMBH + CO. KG, Lübeck (DE)

(72) Inventor: Adrian Schulze, Lübeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 18/014,825

(22) PCT Filed: Jun. 21, 2021

(86) PCT No.: PCT/EP2021/066848
§ 371 (c)(1),
(2) Date: Jan. 6, 2023

(87) PCT Pub. No.: WO2022/008218
PCT Pub. Date: Jan. 13, 2022

(65) Prior Publication Data
US 2023/0225339 A1    Jul. 20, 2023

(30) Foreign Application Priority Data
Jul. 7, 2020   (DE) ............. 10 2020 117 866.2

(51) Int. Cl.
A22C 21/00    (2006.01)
(52) U.S. Cl.
CPC ...... *A22C 21/0053* (2013.01); *A22C 21/0092* (2013.01)

(58) Field of Classification Search
CPC ............ A22C 21/0092; A22C 21/0053; A22C 21/0046
See application file for complete search history.

(56) References Cited

U.S. PATENT DOCUMENTS 5,183,434 A * 2/1993 Scheier .............. A22C 21/0023
452/131
8,678,887 B2    3/2014 Evers
(Continued)

FOREIGN PATENT DOCUMENTS

CA       2806223 A1    8/2013
DE    102006040454 B3   12/2007
(Continued)

*Primary Examiner* — Richard T Price, Jr.
(74) *Attorney, Agent, or Firm* — Dinsmore & Shohl LLP

(57) ABSTRACT

An apparatus for processing a gutted poultry carcass includes a framework, a transport unit mounted on the framework having a transport means, at least one holding apparatus fastened to the transport means for holding the gutted poultry carcass during transport, and at least one processing station for processing the gutted poultry carcass. The processing station includes a knife arrangement for cutting into the gutted poultry carcass or the part located in an effective range of the knife arrangement. A knife of the knife arrangement is movable from a standby position into a cutting position and back. Each holding apparatus is in a position wherein a center axis of the holding apparatus is oriented transverse to a transport direction. The knife is arranged laterally to the transport means and carries out movement of the knife from the standby position into the cutting position as a cutting movement.

20 Claims, 3 Drawing Sheets

(56) References Cited

U.S. PATENT DOCUMENTS

| | | | |
|---|---|---|---|
| 8,801,508 B2 * | 8/2014 | Landt | A22C 21/0069 |
| | | | 452/135 |
| 9,433,223 B2 | 9/2016 | Landt | |
| 2010/0323599 A1 | 12/2010 | Hiddink | |

FOREIGN PATENT DOCUMENTS

| | | |
|---|---|---|
| DE | 102011107067 B3 | 12/2012 |
| EP | 1917859 A2 | 5/2008 |
| EP | 262296.2 A1 | 8/2013 |
| EP | 2622962 A1 | 8/2013 |
| EP | 2622963 A1 | 8/2013 |
| KR | 20180038292 A | 4/2018 |

\* cited by examiner

APPARATUS AND METHOD FOR AUTOMATICALLY PROCESSING GUTTED POULTRY CARCASSES OR PARTS THEREOF

CROSS-REFERENCE TO RELATED APPLICATIONS

This application is the U.S. National Stage of PCT/EP2021/066848 filed on Jun. 21, 2021, which claims priority to German Patent Application 102020117866.2 filed on Jul. 7, 2020, the entire content of both are incorporated herein by reference in their entirety.

FIELD OF THE INVENTION

The invention relates to an apparatus, configured and adapted for automatically processing gutted poultry carcasses or parts thereof, in particular front halves of the poultry carcasses, comprising a framework, a transport unit mounted on the framework and having a revolvingly driven transport means, at least one holding apparatus fastened to the transport means and configured and adapted for holding the poultry carcass or the part thereof during transport in a transport direction T and during processing at a processing station, and at least one processing station for processing the poultry carcasses or the parts thereof, namely a knife arrangement arranged on the framework and configured and adapted for cutting into the back skin of the poultry carcass or of the part thereof located in the effective range of the knife arrangement, wherein, for cutting into the back skin, a knife of the knife arrangement is configured and adapted to be movable from a standby position into a cutting position and back.

The invention relates further to a method for automatically processing gutted poultry carcasses or parts thereof, in particular front halves of the poultry carcasses, comprising the steps: supplying the poultry carcasses or the parts thereof fixed on a holding apparatus of a revolvingly driven transport means in a transport direction T into the region of at least one processing station, namely a knife arrangement for cutting into the back skin of the poultry carcass or of the part thereof, and cutting into the back skin of the poultry carcass or of the part thereof by means of a knife of the knife arrangement, in that the knife is moved from a standby position into a cutting position and back in order to perform a cutting movement.

BACKGROUND OF THE INVENTION

Such apparatuses and methods are used in the poultry-processing industry to process poultry carcasses or parts thereof, namely in particular front halves of the poultry carcasses, in an at least partially automated manner. An important processing step is the cutting into the back skin of the poultry carcass or of the part thereof, whereby skinning of the back in preparation for obtaining fillets is facilitated. To that end, gutted poultry carcasses or the parts thereof, in particular the front halves, are transported by a transport unit in a transport direction T along a transport path. During transport and during processing, the poultry carcasses or the parts thereof are saddled and fixed on a holding apparatus. Along the transport path there is at least one processing station, in the case of the cutting into the back skin the knife arrangement by means of which the incision is made.

For processing, the poultry carcasses or the parts thereof are to be transported by means of the transport means of the transport unit along the transport path through the or each processing station and are to be positioned in relation to the respective processing station of the apparatus in such a manner that the poultry carcass to be processed or the part thereof is in the effective range of the processing station. Conventionally, a plurality of holding apparatuses are fastened on a revolvingly driven transport means of the transport unit. The revolvingly driven transport means, which is guided around deflection and/or drive elements, forms an upper run and a lower run. The upper run and the lower run can lie directly above one another in a vertical plane, so that the drive and/or rotation axes of the deflection elements are oriented substantially horizontally. The plane can, however, also be inclined, for example by 45° to the vertical (oblique position of the drive and/or rotation axes of the deflection elements), so that the upper run and the lower run lie above one another in an obliquely offset manner. The upper run and the lower run can also lie side by side in a plane, wherein the rotation axes of the deflection elements are then oriented substantially vertically. The processing stations, at which the poultry carcasses or the parts thereof can be processed in a vertical orientation relative to the transport direction T or in an orientation parallel to the transport direction T, are positioned accordingly.

A processing station is formed by the knife arrangement for cutting into the back skin of the poultry carcass or of the part thereof. Taking the example of a front half as part of a poultry carcass, the back skin of the front half is to be cut into approximately in the middle in order to prepare for skinning of the back. For processing, the poultry carcasses, taking the example of the front halves, are saddled and fixed on the holding apparatus in such a manner that the front halves conventionally enter the effective range of the knife arrangement suspended upside down in the region of the lower run. The front half thereby has the breast side facing downwards and the rear side facing upwards. The neck side lies on the centre axis M of the holding apparatus, or parallel thereto. More specifically, the notional connection between the anus side and the neck side runs parallel to the centre axis M.

Apparatuses of the generic type are known in which the holding apparatuses are conventionally arranged fixedly and in such a manner that they are secured against rotation relative to the transport means with their centre axes M oriented parallel to the transport direction T and circulate with the transport means in the upper run and in the lower run. In the known apparatuses, the holding apparatuses are transported through the effective region of the knife arrangement forwards, that is to say with their centre axis M parallel to the transport direction T, which is synonymous with the neck of the poultry carcass in front. Cutting, or the cutting movement, then takes place in the transport direction T or contrary thereto, that is to say parallel to the transport direction T. The knife arrangement is moved with the knife into the transport path, so that there is necessarily a cooperating relationship between the knife and the poultry carcass. The distance between the holding apparatuses is sufficiently great that the knife of the knife arrangement has sufficient time, between two holding apparatuses, to be moved from the standby position into the cutting position and back, in order to avoid a collision. The knives of the knife arrangement ultimately lie in alignment with the holding apparatuses in the transport direction T and enter the transport path of the poultry carcass or of the part thereof in order to make the incision in the back skin.

However, it is increasingly becoming necessary to minimise the distance between the individual holding apparatuses for an increased throughput. However, with the reduced distance, there is then no longer sufficient space and sufficient time for the cutting movement of the knife of the knife arrangement.

SUMMARY OF THE INVENTION

The object of the invention is, therefore, to propose a simple and efficient apparatus with which cutting into the back skin is reliably ensured in the case of closely arranged holding apparatuses. A further object of the invention is to propose a corresponding method.

This object is achieved by an apparatus of the type mentioned hereinbefore in that each holding apparatus in the effective range of the knife arrangement is in a position in which the centre axis M of the holding apparatus is oriented transverse to the transport direction T, and in that the knife of the knife arrangement for cutting into the back skin is arranged laterally to the transport means and is configured to carry out the movement from the standby position into the cutting position as a cutting movement and back transverse to the transport direction T of the poultry carcass to be processed or of the part thereof. On the one hand, the transverse position of the holding apparatuses permits a closer arrangement and positioning of the holding apparatuses on the transport means side by side or one behind the other. On the other hand, the knife of the knife arrangement engages into the transport path laterally from outside, whereby a closer frequency of the cutting movements for cutting into the back skin is achieved. In other words, the combination of the transverse position of the poultry carcass to be processed or of the part thereof with the lateral arrangement of the knife for a cutting movement transverse to the transport direction T has the result that, at the correct time, a precise cut into the back skin can be made quickly and safely, that is to say in particular without the risk of collision with following holding apparatuses. With the apparatus according to the invention it is possible for the first time to cut into the back skin of transversely positioned poultry carcasses or parts thereof in an automated manner.

Preferably, an apparatus for cutting into the back skin of a front half of a poultry carcass is claimed, wherein the apparatus can be extended by further processing stations, such as, for example, a skinning device, a filleting device and other processing stations. For each of the processing stations, a different positioning or orientation of the holding apparatuses can be advantageous. The or each holding apparatus, preferably there are a plurality of holding apparatuses arranged spaced apart from one another, can permanently be in the position with the centre axis M transverse to the transport direction T, so that the neck side of the poultry carcass faces outwards. Preferably, however, the holding apparatus is configured to be rotatable relative to the transport means about an axis R which runs perpendicular to the transport direction T, in such a manner that each holding apparatus is configured to be movable at least from a position in which the centre axis M of the holding apparatus is oriented parallel to the transport direction T into a position in which the centre axis M is oriented transverse to the transport direction T and back. As a result, the poultry carcass or the part thereof, for example for cutting into the back skin, can be moved from a longitudinally directed position into a transversely directed position. The or each holding apparatus can remain in the position or be rotated back for further processing steps.

A particularly preferred further development of the apparatus is characterised in that the knife arrangement comprises a holding body arranged on the framework, a knife bracket pivotably mounted on the holding body, at least one knife fastened to the knife bracket, and an actuating mechanism for moving the knife from the standby position into the cutting position and back. The knife can have a single blade or a double blade. It is also possible that two knives are provided. The holding body can be fixedly or movably arranged on the framework. The actuating mechanism can likewise be arranged directly on the framework or preferably on the holding body.

Advantageously, the actuating mechanism is in the form of a pneumatic unit which is arranged on the holding body, wherein the pneumatic unit is connected to the knife bracket in such a manner that the knife bracket is pivotable relative to the holding body about a pivot axis A which is oriented parallel to the transport direction T. The pneumatic unit comprises, for example, a pneumatic cylinder connected to a compressed air unit, and a piston having a piston rod.

The knife bracket can be in one-part or multi-part form. Particularly preferably, the knife bracket is in two-part form. In this case, the knife bracket comprises a support element and a knife holding element, wherein the support element is connected to the pneumatic unit and is pivotable about the pivot axis A, and the knife holding element is arranged on the support element so as to be movable relative thereto. The knife bracket is of claw-like form, such that, by pivoting about the pivot axis A, a cutting movement which is first a hacking movement and then a pulling movement takes place. Because the knife holding element is movable relative to the support element, the knife holding element, on meeting the poultry carcass or the part thereof, is optionally able to yield at least slightly against the downward movement of the support element, in order to avoid too great an application of force to the poultry carcass by the knife and thus damage to the fillet flesh.

A particularly advantageous further development is characterised in that the knife holding element is mounted on the support element and is configured to be pivotable relative to the support element about a pivot axis B against a spring force, wherein the pivot axis B is oriented parallel to the pivot axis A. The knife arrangement is thus adapted to different sizes of the poultry carcasses to be processed or of the parts thereof. Preferably, the position and arrangement of the knife bracket and thus also of the knife in relation to the poultry carcass to be processed or the part thereof is adapted to the smallest size of a poultry carcass or of a part thereof that is to be processed. The initial or the cutting movement of the knife is in principle the same for any size of poultry carcass or part thereof. However, if a larger poultry carcass or a part thereof is transported into the effective range of the knife arrangement and the knife meets this poultry carcass or the part thereof during its cutting movement, the knife holding element is able to yield relative to the support element in order to absorb the knife force at least partially. The extent of the spring force is preferably adjustable.

Advantageously, the knife holding element has an associated abutment element which cooperates with two abutment surfaces formed on the support element in order to limit the pivoting movement of the knife holding element relative to the support element. The abutment element can be, for example, a simple pin. The abutment surfaces can be formed, for example, by a trough-shaped recess in the support element, wherein lateral flanks of the recess form the abutment surfaces. Other abutment structures can, however, likewise be used. The pin is preferably configured to be replaceable, such that the size and/or the shape is variable in order to change the freedom of movement between the abutment surfaces. The abutment element can also be arranged on the support element and cooperates with abutment surfaces on the knife holding element.

A particularly preferred further development is distinguished in that a spring element is clamped between the knife holding element and the support element, in such a manner that the knife holding element is held with its abutment element against one of the abutment surfaces, preferably against the abutment surface that is adapted for small poultry carcasses or parts thereof. The abutment surfaces form as it were the end points of the movability of the knife holding element. Because the abutment element is held in the starting position against the lower abutment surface configured for small poultry carcasses or parts thereof, yielding as far as the upper abutment surface is ensured when processing larger poultry carcasses or parts thereof. The movability of the knife holding element and in particular its pivotability about the pivot axis B against the spring force of the spring element makes it possible, in a particularly simple and reliable manner, to adapt the knife arrangement to different sizes of the poultry carcasses to be processed or of the parts thereof in a manner that is automated and initiated by the poultry carcass to be processed or the part thereof itself. Furthermore, this preferred embodiment prevents too high a force acting on the knife in the case of irregularities in the poultry carcass or the parts thereof, because the knife is able to yield. In other words, the force with which the knife meets the poultry carcass or the part thereof is limited and absorbed. The spring element is preferably exchangeable in order to change the spring force. Instead of the spring element, other damping elements, such as, for example, pneumatic cylinders or the like, can also be used.

Preferably, the knife is arranged fixedly but adjustably on the knife holding element. The adjustment can be configured to take place in locking steps or steplessly.

Expediently, a blade of the knife is sickle-shaped. This sickle-shaped or hook-shaped form and shape of the blade allows the knife to pierce the back skin and perform a pulling cutting movement for a rapid and precise incision. By means of a substantially linear cutting movement after piercing, the back skin can be cut into or also torn into particularly easily.

Optionally, the holding body is connected fixedly and rigidly to the framework. This results in a substantially vertically oriented cutting movement of the knife. A particularly advantageous embodiment is characterised in that the holding body is in the form of a swinging link which is movable relative to the framework. The knife arrangement as a whole is thus able to perform a compensating movement.

The swinging link is preferably mounted on the framework so as to be pivotable about a pivot axis C, wherein the pivot axis is oriented transverse to the transport direction T. The pivot axis preferably lies above the transport means, or the holding apparatuses arranged thereon. Particularly preferably, the swinging link is configured to be deflectable in the transport direction T against a spring force. A pivot movement in and contrary to the transport direction T is thus ensured. With this configuration, the knife arrangement as a whole is configured to be able to yield in the transport direction T. As a result of high transport speeds and other factors, it can be that the knife is "taken along" after it has entered/cut in in the transport direction T by the skin and/or flesh and/or bone. Damage can effectively be prevented by the pivotability of the swinging link, because the knife is moved concomitantly at least in a small portion. The cutting movement and the compensating movement are superimposed on one another, so that the cutting movement and thus the incision become straighter. A straighter cut owing to the concomitant movement of the knife makes it possible to effectively avoid damage to the flesh on both sides of the back-skin cut. Instead of the spring-loaded pivot mechanism of the swinging link, a linear guide for the knife arrangement in and contrary to the transport direction T, for example, can optionally also be provided.

An advantageous further development is characterised in that a spring element is clamped between the swinging link and the framework, in such a manner that the swinging link is held with an abutment surface against an abutment element on the framework in a starting position in which the swinging link with the knife is oriented substantially vertically downwards. In other words, the spring element holds the swinging link and thus also the knife in a substantially vertical orientation as the starting position. In the case of pressure in the transport direction T, the swinging link can then be deflected, wherein the spring element moves the swinging link back into the starting position again after the cut.

Advantageously, the abutment element is in the form of a damping abutment. A back swing of the swinging link can thus effectively be reduced or prevented completely. The abutment element can also be arranged on the swinging link, which abutment element cooperates with an abutment surface on the framework. Instead of the spring element, other damping elements can also be provided.

The object is also achieved by a method comprising the steps mentioned hereinbefore in that the cutting into the back skin is carried out while the poultry carcass or the part thereof is being transported in the transport direction T by the holding apparatus oriented transverse to the transport direction T. The cutting movement transverse to the transport direction T is thus carried out while the holding apparatus is oriented with its centre axis M transverse to the transport direction T and is being transported in the transport direction T in this orientation.

Advantageously, the holding apparatus, before it reaches the processing station for cutting into the back skin, is moved from a position in which the centre axis M of the holding apparatus is oriented parallel to the transport direction T into a position in which the centre axis M is oriented transverse to the transport direction T, wherein in this orientation the incision is made starting from a side of the poultry carcass or of the part thereof that faces the anus in the direction towards the neck side, and then the holding apparatus, for further processing, is moved back again into a position in which the centre axis M of the holding apparatus is oriented parallel to the transport direction T. Optionally, the holding apparatus can also already be in the position transverse to the transport direction T before the back skin is cut. After the back skin has been cut, the holding apparatus can also remain in the position transverse to the transport direction T for further processing steps.

A particularly advantageous further development provides that the knife, during the cutting movement transverse to the transport direction T, is deflected by the poultry carcass or the part thereof, in dependence on the size of the poultry carcass to be processed or of the part thereof, against a spring force in the plane E described by the cutting movement. A yielding movement in the direction away from the poultry carcass or the part thereof is thus possible, in order to limit or damp the pressure of the knife on the poultry carcass or the part thereof and in order to compensate for or avoid uneven regions of the poultry carcass or of the part thereof.

Advantageously, the knife, during the cutting movement transverse to the transport direction T, can be moved by the poultry carcass or the part thereof in the transport direction T against a spring force. During the cutting movement of the knife transverse to the transport direction T, the knife can also be moved in the transport direction T in a superimposed manner, in order in particular to ensure a straight incision in the back skin and in order to avoid damage to the flesh on the left and right of the cutting line.

A particularly preferred further development is characterised in that the method is carried out as disclosed herein.

The advantages arising from the method according to the invention have already been described in detail in connection with the apparatus, and for this reason, in order to avoid repetition, reference is made to the corresponding passages.

BRIEF DESCRIPTION OF THE DRAWINGS

Further expedient and/or advantageous features and further developments relating to the apparatus and to the method will become apparent from the description. Particularly preferred embodiments of the apparatus and the method will be explained in greater detail with reference to the accompanying drawing, in which.

DETAILED DESCRIPTION OF THE INVENTION

Figure 1:
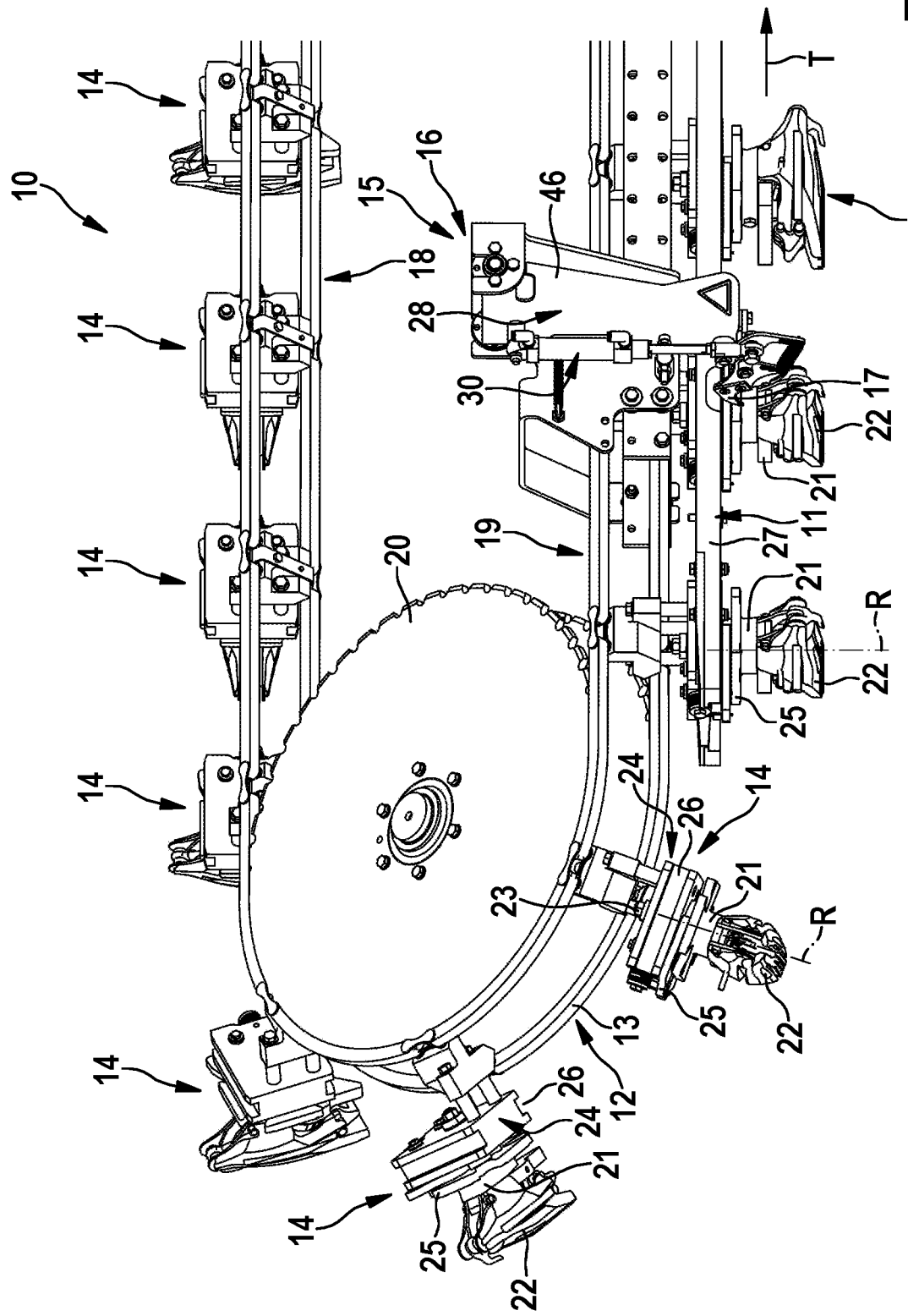
FIG. 1 is a schematic view of a detail of an apparatus according to the invention.
Figure 2:
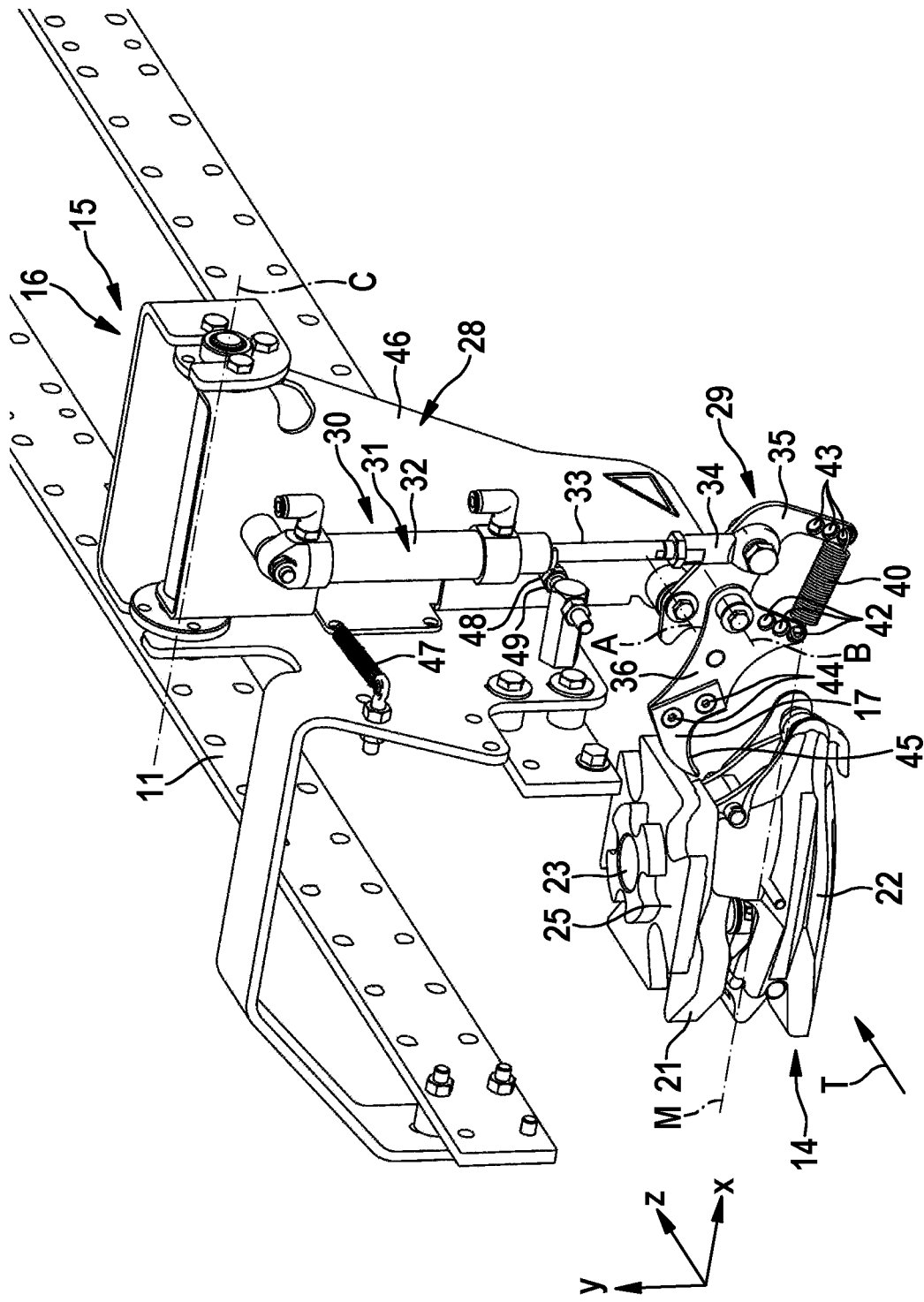
FIG. 2 is a schematic view of the knife arrangement arranged on the framework, seen in the transport direction T.

The apparatus shown in the drawing serves for cutting into the back skin of front halves of a slaughtered poultry carcass and is correspondingly configured and adapted. The apparatus is, however, equally configured and adapted for processing other products which are fixed to a holding apparatus oriented transverse to the transport direction T, from the side and in particular transverse to the transport direction T.

The drawing shows an apparatus 10 which is configured and adapted for automatically processing gutted poultry carcasses or parts thereof, in particular front halves of the poultry carcasses. The apparatus 10 comprises a framework 11, a transport unit 12 mounted on the framework and having a revolvingly driven transport means 13, at least one holding apparatus 14 fastened to the transport means 13 and configured and adapted for holding the poultry carcass or the part thereof during transport in the transport direction T and during processing at a processing station 15, and at least one processing station 15 for processing the poultry carcasses or the parts thereof, namely a knife arrangement 16 arranged on the framework 11 and configured and adapted for cutting into the back skin of the poultry carcass or of the part thereof located in the effective range of the knife arrangement 16, wherein, for cutting into the back skin, a knife 17 of the knife arrangement 16 is configured and adapted to be movable from a standby position into a cutting position and back.

This apparatus 10 is distinguished according to the invention in that each holding apparatus 14 in the effective range of the knife arrangement 16 is in a position in which the centre axis M of the holding apparatus 14 is oriented transverse to the transport direction T, and in that the knife 17 of the knife arrangement 16 for cutting into the back skin is arranged laterally to the transport means 13 and is configured to carry out the movement from the standby position into the cutting position as a cutting movement and back transverse to the transport direction T of the poultry carcass to be processed or of the part thereof.

The features and further developments described in the following text are preferred embodiments when considered on their own and in combination with one another. It is expressly pointed out that features which are combined in the description and/or the drawing or which are described in a common embodiment can also further develop the apparatus 10 described above functionally independently.

In the embodiment shown, the holding apparatus 14 is configured to be rotatable relative to the transport means 13 about an axis $A_H$ which runs perpendicular to the transport direction T, in such a manner that each holding apparatus 14 is configured to be movable at least from a position in which the centre axis M of the holding apparatus 14 is oriented parallel to the transport direction T into a position in which the centre axis M is oriented transverse to the transport direction T.

The number of holding apparatuses 14 is variable. By way of example, a plurality of holding apparatuses 14 are shown, which are fastened, preferably releasably, to the transport means 13, preferably in such a manner that they are spaced apart equally. The transport means 13 forms an upper run 18 and a lower run 19 and is guided around deflection elements 20, which are configured and adapted for deflecting and/or driving the transport means 13 and are rotatable about rotation axes. The rotation axes can be oriented vertically or horizontally or sloping. In the view shown by way of example, the rotation axes are inclined by about 45° relative to the vertical orientation.

Optionally, each holding apparatus 14 is in two-part form and comprises a fastening body 21 and a support body 22 releasably fastened to the fastening body 21, wherein the fastening body 21 is mounted by means of a shaft 23 in a bearing plate 24 fastened to the transport means 13, in such a manner that it is rotatable about the rotation axis $A_H$, and comprises a rotary element 25, preferably a rotary cross, which can be brought into operative connection with an actuating lever in order to rotate the fastening body 21 and thus the holding apparatus 14 about the rotation axis $A_H$. The bearing plates 24 can be arranged directly on the transport means 13. Preferably, the bearing plates 24 are fastened by way of a connecting element (not explicitly shown). The transport means 13 itself is in the form of, for example, a conveyor chain to which the bearing plates 24 are fastened. The bearing plates 24 have at least one guiding groove 26. Guide plates 27 corresponding to/matching this guiding groove 26 are arranged on the framework 11 and extend at least in some portions along the upper run 18 and/or lower run 19.

Rotation of the holding apparatus 14 through preferably in each case 90°, for example by the use of a so-called maltese cross as the rotary element 25, serves to bring the holding apparatus 14, at least in the region of the knife arrangement 16 for cutting into the back skin, into a position in which the holding apparatus 14 is positioned with the centre axis M transverse to the transport direction T. To this end, the maltese cross can in each case be brought into engagement with an actuating lever which is preferably fixed and stationary—and accordingly is to be referred to as passive. However, movable and active actuating elements can also be used.

As mentioned, the or each holding apparatus 14 is configured to be rotatable relative to the transport means 13 about an axis $A_H$ which runs perpendicular to the transport direction T, in such a manner that each holding apparatus 14 is configured to be movable at least from a position in which the centre axis M of the holding apparatus 14 is oriented parallel to the transport direction T into a position in which the centre axis M is oriented transverse to the transport direction T and back. The rotation can take place, for example, through 90° there and then through 90° back. However, the rotation can also take place through 90° there and then through a further 270° in the same direction to the starting position. To that end, corresponding actuating levers are provided in each case.

The knife arrangement 16 comprises a holding body 28 fastened to the framework 11, a knife bracket 29 pivotably mounted on the holding body 28, at least one knife 17 fastened to the knife bracket 29, and an actuating mechanism 30 for moving the knife 17 from the standby position into the cutting position and back. The knife arrangement 16 is a module which can be arranged at virtually any position along the transport path. Preferably, the knife arrangement 16 is arranged in the region of the lower run 19. The actuating mechanism 30 can be arranged directly on the framework 11 or, as shown in the preferred embodiment, on the holding body 28.

The actuating mechanism 30 is preferably in the form of a pneumatic unit 31 which is arranged on the holding body 28, wherein the pneumatic unit 31 is connected to the knife bracket 29 in such a manner that the knife bracket 29 is pivotable relative to the holding body 28 about a pivot axis A which is oriented parallel to the transport direction T. In the embodiment shown, the pneumatic unit 31 comprises a compressed air unit (not explicitly shown), a pneumatic cylinder 32 connected to the compressed air unit, and a piston having a piston rod 33. The free end 34 of the piston rod 33 is connected in an articulated manner to the knife bracket 29. By actuation of the piston rod 33, the knife bracket 29 is pivotable about the pivot axis A in order to carry out a simple cutting movement transverse to the transport direction T. Preferably, the actuating mechanism 30, or the pneumatic unit 31, is connected to a control and/or regulating device which, for example, is also connected to a drive means for the transport means 13 in order to control and/or regulate the exact time of the cutting movement.

The knife bracket 29 can be in one-part form. Preferably, the knife bracket 29 is in at least two-part form, namely comprises a support element 35 and a knife holding element 36, wherein the support element 35 is connected to the pneumatic unit 31 and is pivotable about the pivot axis A, and the knife holding element 36 is arranged on the support element 35 so as to be movable relative thereto. The knife bracket 29 forms a type of claw which, driven pneumatically, very quickly cuts into the back skin at the correct time. The free end 34 of the piston rod 33 is arranged in an articulated manner on the support element 35, specifically offset relative to the pivot axis A. A three-part form of the knife bracket 29 or a knife bracket 29 of four or even more parts can likewise be used. The relative movement between the knife holding element 36 and the support element 35 can be achieved in different ways, for example by a linear movement, a tilting movement or the like. Preferably, the knife holding element 36 is mounted on the support element 35 and is configured to be pivotable relative to the support element 35 about a pivot axis B against a spring force, wherein the pivot axis B is oriented parallel to the pivot axis A but arranged offset relative thereto.

Figure 3:
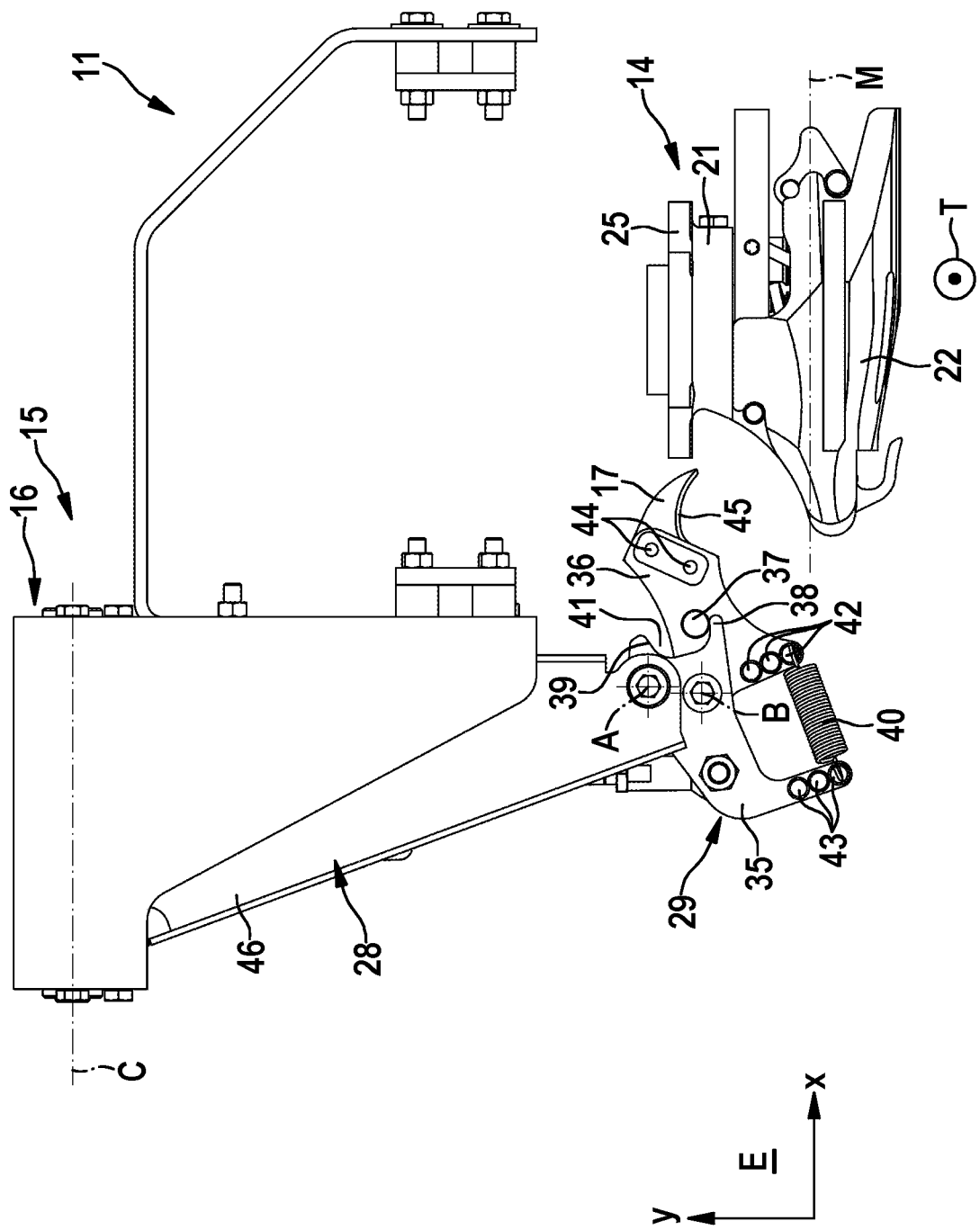
FIG. 3 shows the view according to FIG. 2, seen contrary to the transport direction T.

The knife holding element 36 has an associated abutment element 37 which cooperates with two abutment surfaces 38, 39 formed on the support element 35 in order to limit the pivot movement of the knife holding element 36 relative to the support element 35. A spring element 40 is clamped between the knife holding element 36 and the support element 35, in such a manner that the knife holding element 36 is held with its abutment element 37 against one of the abutment surfaces 38, preferably against the abutment surface 38 that is adapted for small poultry carcasses or parts thereof. In FIG. 3, which shows the knife bracket 29 in the standby position, the abutment surface 38 for small poultry carcasses or parts thereof is the lower abutment surface 38. The abutment surfaces 38, 39 are part of a trough-shaped recess 41 on the support element 35. The spring element 40 is arranged on the knife bracket 29 so as to be exchangeable. Different fastening points 42, 43 to which the spring element 40 can be fastened are formed both on the support element 35 and on the knife holding element 36.

The knife 17 is fixedly but adjustably arranged on the knife holding element 36. In the embodiment shown, the knife 17 is releasably fastened to the knife holding element 36 by two screws 44. The knife 17 can also be releasably fastened to the knife holding element 36 in a different way. Different locking or fastening positions are possible for the knife 17, in order to be able to vary the position or inclination of the knife 17 in relation to the knife holding element 36. Optionally, the knife 17 or a blade 45 of the knife 17 can be formed in one piece and integrally with the knife holding element 36. The knife 17, or more precisely the blade 45 of the knife 17, is sickle-shaped. Blade shapes other than a sickle or scythe shape, that is to say the curved form of the blade 45, such as, for example, linear blades 45, are likewise possible, as are different forms of the cut of the blade 45.

The holding body 28 can be fixedly and rigidly connected to the framework 11 or arranged thereon. In the preferred embodiment according to the drawing, the holding body 28 is in the form of a swinging link 46 which is movable relative to the framework 11. The movement relative to the framework 11 can take place linearly, for example by means of a linear drive with which the holding body 28 is movable, for example, in or contrary to the transport direction T. Thus, during processing, that is to say during cutting into the back skin, the holding body 28 can "move along" with the holding apparatus 14 of the transport means 13 in the transport direction T, in order to be moved back into the starting position again on completion of the cutting movement. Preferably, the swinging link 46 is mounted on the framework 11 so as to be pivotable about a pivot axis C, wherein the pivot axis C is oriented transversely to the transport direction T and thus also transversely to the pivot axes A and B. A reciprocating movement, specifically in the transport direction T and back, is thus possible with the swinging link 46. The reciprocating movement can be free. Preferably, the swinging link 46 is configured to be deflectable in the transport direction T against a spring force. To that end, a spring element 47 is clamped between the swinging link 46 and the framework 11 in such a manner that the swinging link 46 is held with an abutment surface 48 against an abutment element 49 on the framework 11 in a starting position in which the swinging link 46 with the knife 17 is oriented substantially vertically downwards. The abutment element 49 is preferably in the form of a damping abutment.

The method will be explained in greater detail in the following text with reference to the drawing. The method serves for the automatic processing of gutted poultry carcasses or parts thereof, in particular of front halves of gutted poultry carcasses. In particular, the method serves for cutting the back skin of front halves of gutted poultry carcasses. To that end, poultry carcasses or parts thereof fixed to a holding apparatus 14 of a revolvingly driven transport means 13 are conveyed in a transport direction T into the region of at least one processing station 15, namely a knife arrangement 16 for cutting into the back skin of the poultry carcass or of the part thereof. The poultry carcasses or the parts thereof, namely in particular the front halves, are transported automatically. When they reach the knife arrangement 16, the back skin of the poultry carcass or of the part thereof is cut into by means of a knife 17 of the knife arrangement 16, in that the knife 17 is moved from a standby position into a cutting position and back in order to perform a cutting movement.

According to the invention, cutting into the back skin is carried out while the poultry carcass or the part thereof is being transported in the transport direction T by the holding apparatus 14 oriented transverse to the transport direction T. In other words, the holding apparatus 14 is positioned with the saddled and fixed poultry carcass or the part thereof transverse to the direction of transport T. In this transverse position, transport in the transport direction T takes place continuously, so that the knife is moved into the transport path from the side/outside. A cutting movement superimposed on the transport movement is carried out. These movements take place transverse to one another.

The holding apparatus 14 can be in the above-described transverse position during the entire transport through the apparatus 10. Preferably, before the holding apparatus 14 reaches the processing station 15 for cutting into the back skin, it is moved from a position in which the centre axis M of the holding apparatus 14 is oriented parallel to the transport direction T into a position in which the centre axis M is oriented transverse to the transport direction T. In this orientation, the incision cut is made starting from a side of the poultry carcass or of the part thereof that faces the anus in the direction towards the neck side. Then, for the further processing, the holding apparatus 14 is moved back again into a position in which the centre axis M of the holding apparatus 14 is oriented parallel to the transport direction T.

Preferably, during the cutting movement transverse to the transport direction T, the knife 17, in dependence on the size of the poultry carcass to be processed or of the part thereof, is deflected by the poultry carcass or the part thereof against a spring force in the plane E described by the cutting movement. In other words, the knife 17 is able to deflect in that the knife 17 can be pushed outwards, contrary to the cutting movement or the movement direction of the knife 17, against the spring force by the poultry carcass or the part thereof.

Optionally, it is further possible that the knife 17, during the cutting movement transverse to the transport direction T, moves or can be moved in the transport direction T against a spring force by the poultry carcass or the part thereof. Transport of the holding apparatus 14 in the transport direction T results in the knife 17 being "carried along" as it enters the back skin and/or the underlying flesh/tissue and/or bone. On completion of the cutting movement, when the knife 17 has left the poultry carcass or the part thereof completely, the knife 17, or a swinging link 46 carrying the knife 17, is moved back into the substantially vertical orientation again, preferably by a spring force.

Particularly preferably, the method is carried out with an apparatus 10 according to one or more of claims 1 to 15.

The invention claimed is:

1. An apparatus, configured and adapted for automatically processing a gutted poultry carcass or a part of the gutted poultry carcass including front halves of the poultry carcass, the apparatus comprising:
   a framework;
   a transport unit mounted on the framework and having a revolvingly driven transport means;
   at least one holding apparatus fastened to the transport means and configured and adapted for holding the gutted poultry carcass or the part of the gutted poultry carcass during transport in a transport direction T and during processing; and
   at least one processing station for processing the gutted poultry carcass or the parts of the gutted poultry carcass, the processing station comprising a knife arrangement arranged on the framework and configured and adapted for cutting into a back skin of the gutted poultry carcass or of the part of the gutted poultry carcass located in an effective range of the knife arrangement, wherein, for cutting into the back skin, a knife of the knife arrangement is configured and adapted to be movable from a standby position into a cutting position and back, wherein each holding apparatus of the at least one holding apparatuses, when in the effective range of the knife arrangement, is in a position wherein:
   a center axis M of the holding apparatus is oriented transverse to the transport direction T, and
   the knife of the knife arrangement is arranged laterally to the transport means and is configured to carry out movement of the knife from the standby position into the cutting position as a cutting movement and back transverse to the transport direction T of the gutted poultry carcass or of the part of the gutted poultry carcass.

2. The apparatus of claim 1, wherein the holding apparatus is configured to be rotatable relative to the transport means about an axis AH which runs perpendicular to the transport direction T, wherein each holding apparatus is configured to be movable at least from a position in which the center axis M of the holding apparatus is oriented parallel to the transport direction T into a position in which the center axis M is oriented transverse to the transport direction T and back.

3. The apparatus of claim 1, wherein the knife arrangement further comprises:
   a holding body arranged on the framework;
   a knife bracket pivotably mounted on the holding body;
   at least one knife fastened to the knife bracket; and
   an actuating mechanism for moving the knife from the standby position into the cutting position and back.

4. The apparatus of claim 3, wherein the actuating mechanism is a pneumatic unit arranged on the holding body, wherein the pneumatic unit is connected to the knife bracket in such a manner that the knife bracket is pivotable relative to the holding body about a pivot axis A, wherein the pivot axis A is oriented parallel to the transport direction T.

5. The apparatus of claim 3, wherein the knife bracket has at least two parts, the at least two parts comprising:
   a support element; and
   a knife holding element, wherein:
   the support element is connected to the pneumatic unit and is pivotable about the pivot axis A, and the knife holding element is arranged on the support element, wherein the knife holding element is movable relative to the support element.

6. The apparatus of claim 5, wherein the knife holding element is mounted on the support element and is configured to be pivotable relative to the support element about a pivot axis B against a spring force, wherein the pivot axis B is oriented parallel to the pivot axis A.

7. The apparatus of claim 5, wherein the knife holding element has an associated abutment element which cooperates with a first abutment surface and a second abutment surface of the support element, wherein the associated abutment element limits the pivot movement of the knife holding element relative to the support element.

8. The apparatus of claim 7, wherein a spring element is clamped between the knife holding element and the support element, wherein the knife holding element is held with the abutment element against the first abutment surface, wherein the abutment surface is adapted for small poultry carcasses or parts thereof.

9. The apparatus of claim 5, wherein the knife is arranged fixedly and adjustably on the knife holding element.

10. The apparatus of claim 3, wherein the holding body is a swinging link which is movable relative to the framework.

11. The apparatus of claim 10, wherein the swinging link is mounted on the framework so as to be pivotable about a pivot axis C, wherein the pivot axis C is oriented transverse to the transport direction T.

12. The apparatus of claim 10, wherein the swinging link is configured to be deflectable in the transport direction T against a spring force.

13. The apparatus of claim 10, wherein a spring element is clamped between the swinging link and the framework, wherein the swinging link is held with an abutment surface against an abutment element of the framework in a starting position in which the swinging link is oriented substantially vertically downwards.

14. The apparatus of claim 13, wherein the abutment element is a damping abutment.

15. The apparatus of claim 1, wherein a blade of the knife is sickle-shaped.

16. A method for automatically processing a gutted poultry carcasses or a part of the gutted poultry carcass including a front half of the gutted poultry carcass, the method comprising:
supplying the gutted poultry carcass or the part of the gutted poultry carcass, the gutted poultry carcass or the part of the gutted poultry carcass fixed on a holding apparatus, of a revolvingly driven transport means, in a transport direction T into a region of at least one processing station, the processing station comprising a knife arrangement for cutting into the back skin of the gutted poultry carcass or of the part of the gutted poultry carcass, and
cutting into the back skin of the gutted poultry carcass or of the part of the gutted poultry carcass with a knife of the knife arrangement, wherein the knife is moved from a standby position into a cutting position and back in order to carry out a cutting movement, wherein the cutting into the back skin is carried out while the gutted poultry carcass or the part of the gutted poultry carcass is being transported in the transport direction T by the holding apparatus oriented transverse to the transport direction T.

17. The method of claim 16, wherein the holding apparatus, before reaching the processing station for cutting into the back skin, is moved from a first position in which a center axis M of the holding apparatus is oriented parallel to the transport direction T and moved into a second position in which the center axis M is oriented transverse to the transport direction T, wherein, when the holding apparatus in the second position, an incision is made in the gutted poultry carcass or a part of the gutted poultry carcass, the incision starting from a first side of the gutted poultry carcass or of the part of the gutted poultry carcass that faces an anus of the gutted poultry carcass or the part of the gutted poultry carcass in an incision direction towards a neck side of the gutted poultry carcass or a part of the gutted poultry carcass, and, after the incision is made, for further processing, the holding apparatus is moved back again into the first position.

18. The method of claim 16, wherein the knife, during the cutting into the back skin, is deflected by the gutted poultry carcass or the part of the gutted poultry carcass against a spring force in a plane E defined by the cutting movement, wherein the deflection depends on the size of the gutted poultry carcass or of the part of the gutted poultry carcass.

19. The method of claim 16, wherein the knife, during the cutting into the back skin, can be moved by the gutted poultry carcass or the part of the gutted poultry carcass in the transport direction T against a spring force.

20. The method of claim 16, wherein the method is carried out by an apparatus configured and adapted for automatically processing a gutted poultry carcass or a part of the gutted poultry carcass including front halves of the poultry carcass, the apparatus comprising:
a framework;
a transport unit mounted on the framework and having a revolvingly driven transport means;
at least one holding apparatus fastened to the transport means and configured and adapted for holding the gutted poultry carcass or the part of the gutted poultry carcass during transport in a transport direction T and during processing; and
at least one processing station for processing the gutted poultry carcass or the parts of the gutted poultry carcass, the processing station comprising a knife arrangement arranged on the framework and configured and adapted for cutting into a back skin of the gutted poultry carcass or of the part of the gutted poultry carcass located in an effective range of the knife arrangement, wherein, for cutting into the back skin, a knife of the knife arrangement is configured and adapted to be movable from a standby position into a cutting position and back, wherein each holding apparatus of the at least one holding apparatuses, when in the effective range of the knife arrangement, is in a position wherein:
a center axis M of the holding apparatus is oriented transverse to the transport direction T, and
the knife of the knife arrangement is arranged laterally to the transport means and is configured to carry out movement of the knife from the standby position into the cutting position as a cutting movement and back transverse to the transport direction T of the gutted poultry carcass or of the part of the gutted poultry carcass.

* * * * *